March 29, 1927.

C. SCHRAMM 1,622,678

CENTERING MACHINE

Filed Feb. 8, 1924

INVENTOR
Carl Schramm
BY Wayne B Wells
ATTORNEY

March 29, 1927.

C. SCHRAMM 1,622,678

CENTERING MACHINE

Filed Feb. 8, 1924

INVENTOR
Carl Schramm
BY Wayne B Wells
ATTORNEY

March 29, 1927.

C. SCHRAMM

1,622,678

CENTERING MACHINE

Filed Feb. 8. 1924

INVENTOR
Carl Schramm
BY Wayne B Well.
ATTORNEY

Patented Mar. 29, 1927.

1,622,678

UNITED STATES PATENT OFFICE.

CARL SCHRAMM, OF WEST HARTFORD, CONNECTICUT, ASSIGNOR TO PRATT & WHITNEY COMPANY, OF NEW YORK, N. Y., A CORPORATION OF NEW JERSEY.

CENTERING MACHINE.

Application filed February 8, 1924. Serial No. 691,400.

My invention relates to centering machines and particularly to automatic machines for centering blanks.

One object of my invention is to provide an automatic centering machine that shall drill the center hole in a blank in two stages by first making a roughing cut at one station and then a finishing cut at another station.

Another object of my invention is to provide an automatic centering machine that shall have a blank carrying turret for successively and automatically indexing the blanks carried thereby to a loading station, a roughing station, a finishing station and an unloading station.

Another object of my invention is to provide an automatic centering machine that shall have the drilling tool resiliently held in engagement with the work and that shall rotate the tool and the blank in opposite directions.

A further object of my invention is to provide an automatic centering machine of the above indicated character that shall be provided with a loose collar rotatably mounted on the drill spindle for engaging the blank when the hole in the blank is drilled to depth and that shall have grooves formed in the collar to take care of the blank chips.

In a machine constructed in accordance with my invention, a blank carrying turret is provided for moving the blanks carried thereby to four stations. At the first station, blanks are inserted in the spindles carried by the turret; at the second station center holes are partially drilled in the blanks; at the third station the drilling of the center holes is finished and at the fourth station the blanks are unloaded. The various operations effected at the four stations are all automatic and are controlled by cam drums which are located on one cam shaft.

The cam shaft carries a cam disk on which a cam groove is formed for automatically controlling the indexing of the turret. Another cam groove on a drum is provided for simultaneously opening and closing two of the chucks carried by the turret. A third cam groove on another drum is provided for limiting the position of the blank being loaded in one spindle and for unloading a blank from another blank-carrying spindle. Another cam groove is formed on a third drum for controlling the carrying of blanks from a hopper to a position adjacent to the blank-carrying spindle which is to be loaded. A cam groove is formed on the third drum for moving the roughing and the finishing drills into engagement with two of the blanks carried by the turret. A third groove is provided on the third drum for controlling the loading of blanks in the turret.

A loose collar is rotatably mounted on each of the drill spindles in order to engage the blank when it is drilled to depth. Moreover, the drills are resiliently held in engagement with the blank. By providing a roughing and a finishing station for drilling the center holes, it is possible to increase the speed of operation without danger of spoiling the work or breaking the drills. Moreover, by reason of the loose collars on the drill spindles and the providing of resilient supports for the drills, the drills are protected and are insured against drilling the center holes beyond depth.

Referring to the accompanying drawings, a machine is illustrated comprising a frame 1 which is mounted on a suitable base 2. A cam shaft 3, which is provided with suitable bearings 4, 5, 6 and 7 in the frame 1, carries cam drums 8, 9 and 10. The cam drums are fixedly secured to the cam shaft 3 by means of bolts 11. A worm wheel 12, which is keyed to the cam shaft 3 in any suitable manner, has a cam disc 13 secured thereto by means of screws 14. The cam disc 13, in a manner to be hereinafter set forth, controls the indexing of the blank carrying turret.

Figure 1:
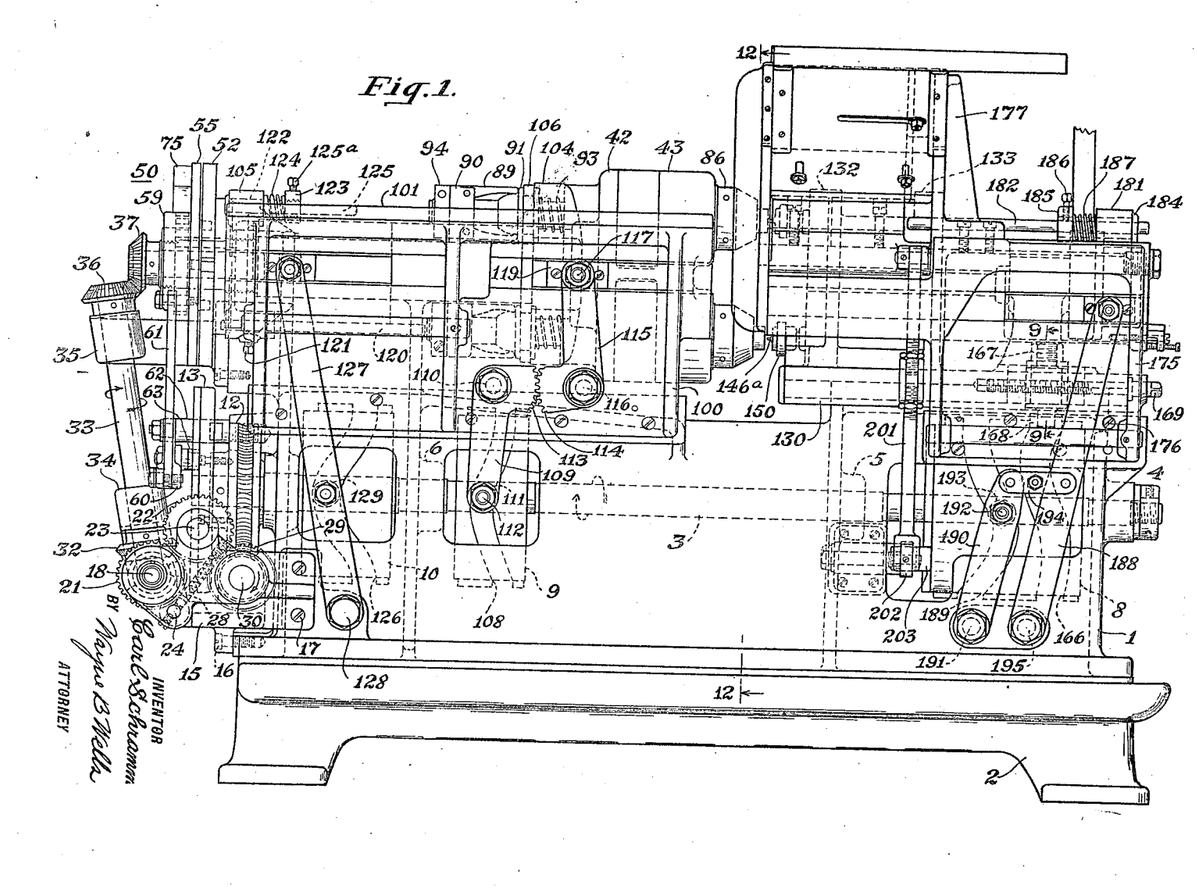
Figure 1 is a side elevational view of a machine constructed in accordance with my invention.
Figure 2:
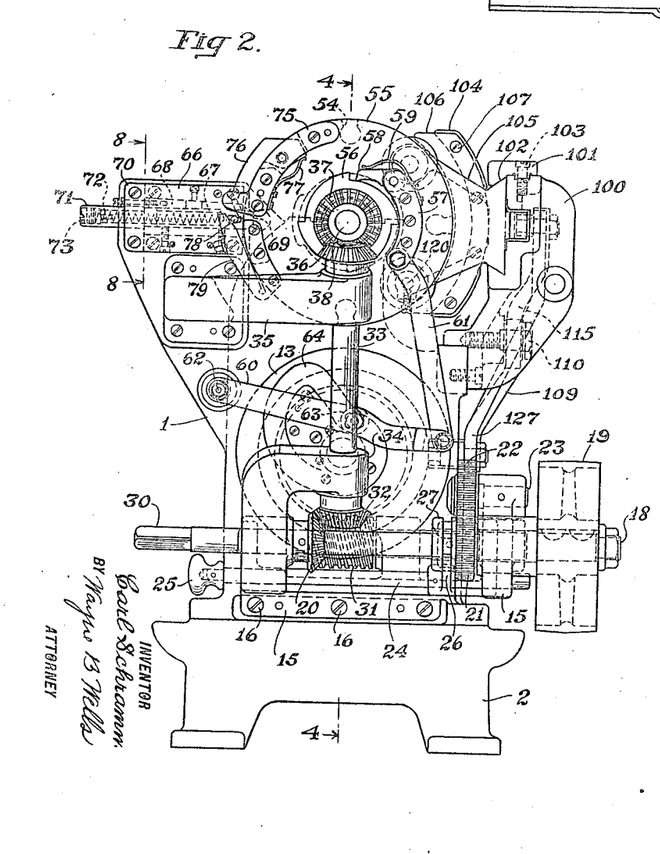
Figs. 2 and 3 are end elevational views of the machine shown in Fig. 1.

A power bracket 15 is secured to the frame 1 by means of screws 16 and 17, as indicated in Figs. 1 and 2 of the drawings. The power bracket carries a pulley shaft 18 on which a pulley 19, a bevel gear wheel 20 and a gear wheel 21 are mounted. The pulley 19 is connected to any suitable source of power. The gear wheel 21 meshes with a second gear wheel 22 which is supported on a stud bolt 23. The bolt 23 is suitably secured to the power bracket 15. The gear wheel 21 is splined to the shaft 18 but is slidable thereon in order to disconnect the cam shaft 3 from the source of power at will. The movement of the gear wheel 21 on the shaft 18 is controlled by a rod 24. The rod 24 has a knob 25 on one end thereof and carries a forked lever 26 which engages a collar formed in the hub 27 of the gear wheel 21. A spring member 28, which is held in an orifice formed in the power bracket 15, as shown in Fig. 1 of the drawings, forces a suitable pin or ball into engagement with detents formed in the rod 24 in order to hold the rod in either of its two positions.

The gear wheel 22 meshes with a gear wheel 29 which is mounted on a worm shaft 30. The worm shaft 30 is provided with suitable bearings in the power bracket 15 and carries a worm member 31. The worm member 31 meshes with the worm wheel 12 on the cam shaft 3.

The bevel gear wheel 20, which is mounted on the pulley shaft 18, meshes with a bevel gear wheel 32 which is mounted on a shaft 33. The shaft 33 has a bearing in an arm 34, which extends from the power bracket 15, and a second bearing in a bracket 35 which is suitable secured to the frame 1 of the machine. The shaft 33 also carries a bevel gear wheel 36 which meshes with a bevel gear wheel 37. The gear wheel 37 is mounted on the turret spindle shaft 38.

Figure 5:
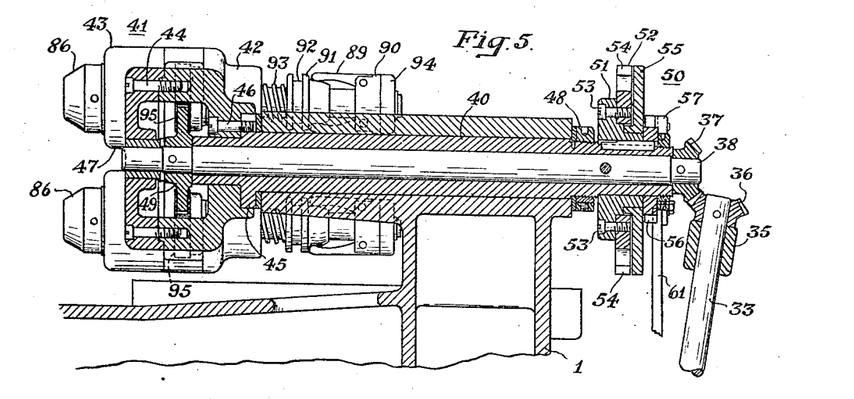
Fig. 5 is a sectional view taken along the line 5—5 of Fig. 6.
Figure 6:
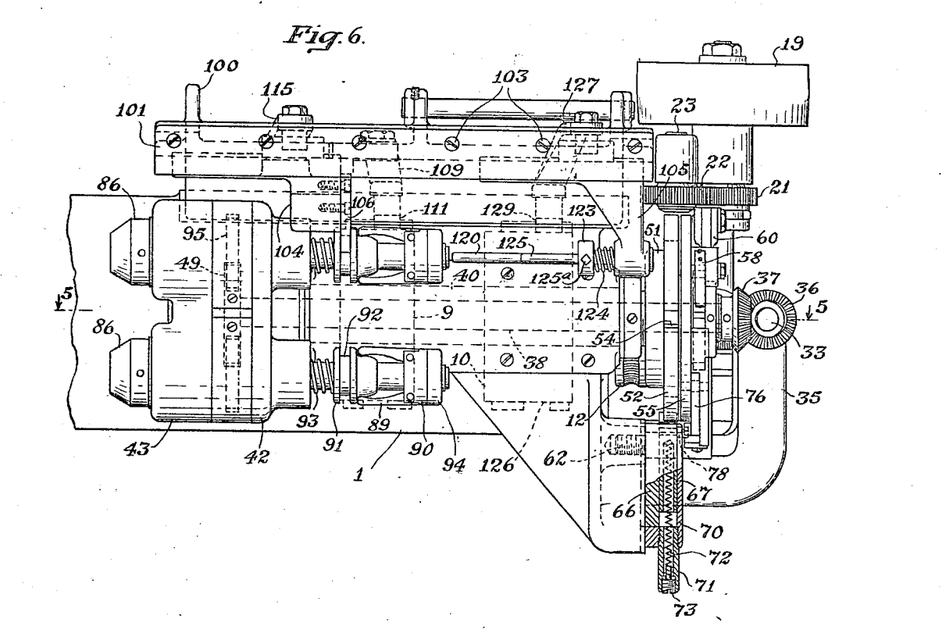
Fig. 6 is a plan view of a portion of the machine shown in Fig. 1.
Figure 7:
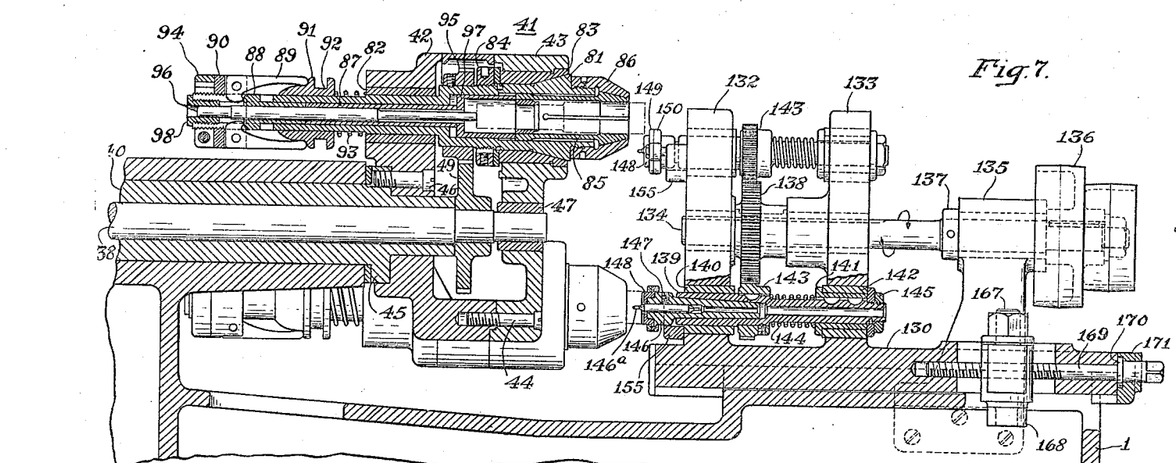
Fig. 7 is a sectional view taken along the line 7—7 of Fig. 3.
Figure 8:
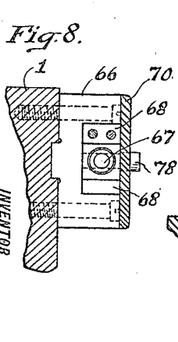
Fig. 8 is a sectional view taken along the line 8—8 of Fig. 2.

The shaft 38 rotates in the turret sleeve 40 which has a suitable bearing in the main frame 1 of the machine, as shown in Figs. 5 and 7 of the drawings. A blank carrying turret 41 comprising a turret frame 42 and a turret cap 43 is provided. The cap 43 is secured to the frame 42 by means of suitable bolts 44. The main frame 42 of the turret is secured to a flange 45 on the turret sleeve 40 by means of bolts 46. A bushing 47, which is mounted on the end of the shaft 38, provides a bearing for the cap 43. A nut 48, which is screwed to one end of the spindle sleeve 40, cooperates with the flange 45 to prevent any longitudinal movement of the turret sleeve 40 and the shaft 38 in the bearing formed in the main frame 1. A gear wheel 49, which is fixedly connected to the turret end of the shaft 38, serves to continuously rotate the blank carrying spindles in a manner to be hereinafter set forth. An indexing mechanism 50, which is operated by the cam disc 13, is mounted on one end of the spindle sleeve 40.

The indexing mechanism 50 comprises a flange member 51 which is keyed to the spindle sleeve 40. An index plate 52, which is mounted on the flange 51, is secured thereto by means of screws 53. The plate 52 is provided with notches 54 formed in the periphery thereof for locking the blank carrying turret in any operative position. An index disc 55 is rotatably mounted on the flange 51 adjacent to the plate 52. An index ratchet wheel 56 is keyed to the turret sleeve 40 adjacent to the flange 51. A pawl support 57, which is mounted on the index disc 55, carries a pawl 58. The pawl 58 is forced into engagement with the teeth on the ratchet wheel 56 by means of a spring member 59, as shown in Fig. 2 of the drawings. An index lever 60 is connected to the pawl support 57 on the index disc 55 by means of a link 61. The index lever 60 is pivotally supported on the main frame 1 by means of a suitable stud bolt 62. The lever 60 carries a suitable roller member 63 which moves in a cam groove 64 formed in the cam disc 13. Thus, the index disc 55 is moved in accordance with the shape of the cam groove 64 which is formed on the cam disc 13. The movement of the index disc 55 operates the ratchet wheel 56 to index the blank carrying turret.

A plunger block 66 is mounted on the main frame 1 of the machine adjacent to the index plate 52 and the index disc 55. A plunger member 67 is slidably mounted in the plunger block 66 between two gibs 68. The gibs 68 may be adjusted in any suitable manner. The plunger 67 is provided with a wedge shaped end 69 which is adapted to fit the notches 54 formed in the index plate 52. A cover 70, which is provided for the plunger block 66, carries a sleeve 71. A spring member 72 is disposed between a screw 73, which is secured in the end of the sleeve 71, and the plunger 67 for exerting a force tending to move the plunger into engagement with the index plate 52.

In order to control the movement of the plunger 67 in accordance with the indexing of the turret, the index disc 55 is provided with a latch holder 75. A latch member 76, which is pivotally supported on the index disc 55 by the latch holder 75, is forced by a spring member 77 into a position to engage a pin 78 on the plunger 67. Thus, when the disc 55 is moved in a counterclockwise direction, as shown in Fig. 2 of the drawings, the latch 76 engages the pin 78 to withdraw the plunger 67 from a notch 54 in the plate 52 just prior to the engagement of the pawl 58 with a tooth on the ratchet wheel 56. At the end of an indexing movement and when the disc 55 is being moved in a clockwise direction by the cam disc 13, a plunger locking cam 79, which is secured to the index disc 55, engages the plunger pin 78 not only to insure the movement of the plunger into a notch 54 but also to lock the plunger in such position. Upon movement of the index disc 55 in a counter-clockwise direction to effect another indexing movement, the locking cam 79 is moved away from the pin 78 to permit the latch 76 to engage the pin 78 and move the plunger away from the index plate 52.

The four blank carrying spindles, which are mounted in the turret 41, are similar in construction and operation and accordingly only one spindle will be described in detail. Referring particularly to Fig. 7 of the drawings, the blank carrying spindle comprises a spindle sleeve 81 which is supported by a bushing 82 in the turret frame 42 and a bushing 83 in the turret cap 43. A nut 84, which is threaded to the spindle sleeve, co-operates with the bushing 83 to prevent any longitudinal movement of the sleeve in the turret. A chuck member 85, which cooperates with a nut 86 for engaging and holding a blank, is positioned in the spindle sleeve 81. The chuck member 85 is engaged by a ring 97. The ring 97 is operated by a tube 87 and the tube is operated by a plunger 88. The plunger 88 is moved longitudinally in the spindle sleeve 81 by means of two levers 89. The levers 89 are pivotally mounted on a collar 90 which is carried by the sleeve 81. The levers 89 are operated by a wedge member 91. An adjusting nut 94 engages the collar 90. The wedge member 91 has a groove 92 formed therein and is engaged by a spring member 93. The spring member exerts a force on the wedge member 91 in such direction as to tend to lock a blank in the chuck. The wedge member is operated in a manner to be hereinafter set forth for opening and closing the chuck member 85 to permit the loading and unloading of blanks in the turret. A gear wheel 95, which is secured to the spindle sleeve 81, meshes with a gear wheel 49 on the turret shaft 38. A push-out rod 96 projects through a sleeve 98, the plunger 88, the sleeve 87 and the ring 97 to engage the end of a blank.

Figures 13, 14:
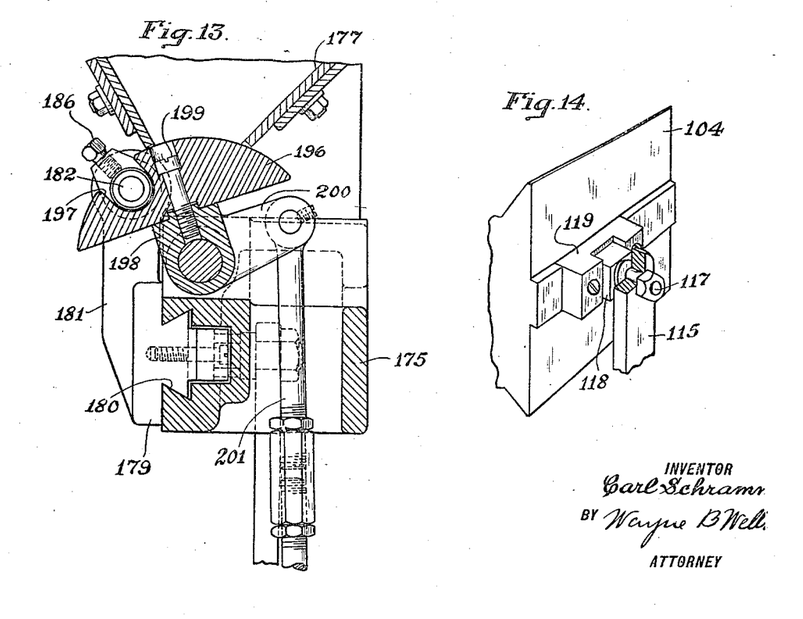
Fig. 13 is a sectional view along the line 13—13 of Fig. 4.
Fig. 14 is an enlarged view of the connection between the chuck operating slide and the operating lever therefor.

A bracket 100, which is secured to the main frame 1 in any suitable manner, is provided with a gib 101 for forming a guideway 102. The gib 101 is secured to the bracket 100 by means of screws 103. A chuck closing slide 104 and a push-out slide 105 are adapted to operate in the guideway 102. The chuck closing slide 104 has a plate 106 secured to one end thereof by means of screws 107. The plate 106 is so shaped as to always fit in the grooves 92 in two of the wedge members 91. Thus, by moving the chuck closing slide 104, two of the chucks in the blank carrying spindles are simultaneously opened or closed. The slide 104 is controlled by the cam drum 9 which has a cam groove 108 formed thereon. A bell crank lever 109, which is pivotally supported on the bracket 100 by means of a stud bolt 110, is provided with a roller 111 on the bolt 112. The roller 111 is fitted to the cam groove 108. The opposite end of the bell crank lever is provided with gear teeth 113 which mesh with similar gear teeth 114 on a second bell crank lever 115. The second bell crank lever 115 is pivotally mounted on the bracket 100 by means of a bolt 116. The opposite end of the bell crank lever 115 is connected to the chuck closing slide 104 by means of a bracket bolt 117 which is secured to a block 118. The block 118 slides in a second block 119, which is fixedly secured to the slide 104, as shown in Fig. 14 of the drawings. Thus, the cam groove 108 in the cam drum 9 operates the two bell crank levers 109 and 115 to move the slide 104 and simultaneously open and close two of the chucks in the blank carrying spindles.

The push-out slide 105 carries a push-out rod 120 which is secured to the slide by a set screw 121. The push-out rod 120 is aligned with one of the blank carrying spindles when the turret is in an indexed position and when moved forward by the slide 105 engages the end of a push-out rod 96 to force a blank out of one of the chucks. A bushing 122 is slidably mounted in an arm of the push-out slide 105 above the push-out rod 120. A sleeve nut 123 is threadably connected to the bushing 122 and a spring member 124 is disposed between the nut 123 and the arm of the slide 105. A rod 125, which projects through the bushing 122, is secured to the nut 123 and the bushing by means of a set screw 125$^a$. The bushing 122 has a collar formed on one end of it in order to limit the longitudinal movement thereof through the opening formed in the arm of the slide 105. The rod 125 is aligned with the blank carrying spindle disposed above the push-out rod 120 and when the slide 105 is moved forward the rod 125 engages one of the rods 96 to limit the movement of a new blank into the turret. The spring 124 permits a limited movement of the rod 125 with respect to the slide 105, but maintains the position of the rod 125 in the blank carrying spindle unchanged. The slide 105 is operated by a cam groove 126 which is formed on the cam drum 10. A lever 127 is pivotally mounted on the main frame 1 by means of a stud bolt 128. The lever carries a roller 129 which is fitted to the cam groove 126.

The upper end of the lever 127 is connected to the slide 105 in the same manner as the bell crank lever 115 is connected to the chuck closing slide 104.

In the operation of the machine, the chuck closing slide 104 is first moved towards the right, as shown in Fig. 1 of the drawings, to open two of the chucks on the spindle. The slide 105 is moved towards the right, as shown in Fig. 1 of the drawings, to eject the blank carried by one of the chucks and to limit the movement of the blank which is being inserted in another chuck.

Figure 3:
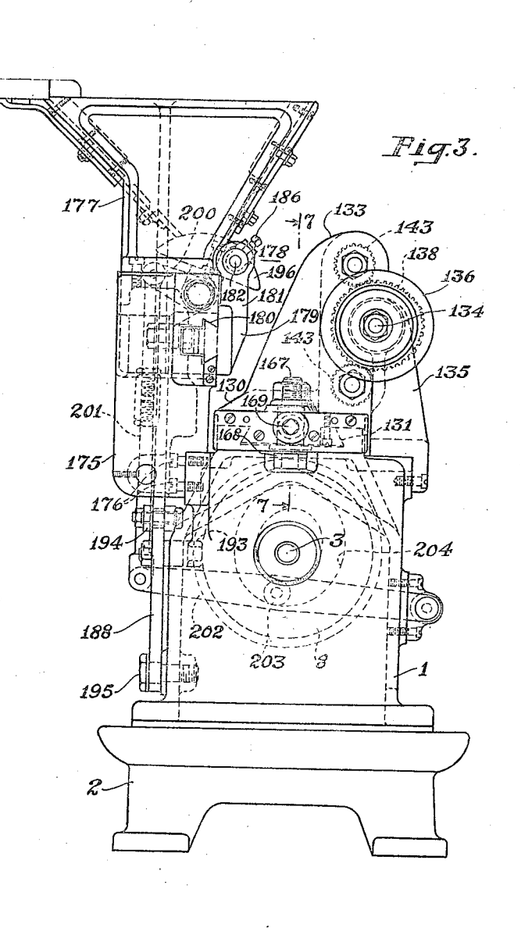

A drill-carrying slide 130 is adapted to operate on a guideway 131 formed in the frame 1 of the machine. The slide 130 carries two uprights 132 and 133 which support a roughing and finishing drill spindle and one end of a driving shaft 134. The opposite end of the shaft 134 is provided with a bearing in a bracket 135 which is secured to the main frame 1 of the machine, as illustrated in Fig. 3 of the drawings. A driving pulley 136 is secured to the shaft 134 on one side of the bracket 135 and a collar 137 is secured to the shaft 134 on the opposite side of the bracket 135. A gear wheel 138, which is splined to the shaft 134, is disposed between the two uprights 133 and 132. The gear wheel 138 serves to operate the drill spindles in a manner to be hereinafter set forth.

The drill spindles are similar in construction and accordingly a description of only one of such spindles will be given. The drill spindle comprises a sleeve 139 which is supported by a bushing 140 in the upright 132. A bushing 141, which is keyed to the sleeve 139, is supported by a bushing 142 in the upright 133. A gear wheel 143, which meshes with the gear wheel 138 on the shaft 134, is keyed to the sleeve 139 between the two uprights 132 and 133. A spring member 144, which is disposed between the gear wheel 143 and the bushing 141, serves to exert a force tending to move the sleeve 139 and the drill carried thereby towards the blank. A nut 145, which is secured to the end of the sleeve 139, limits the longitudinal movement of the drill by the spring member 144 towards the blank. A drill holder 146 is mounted in the sleeve 139 and a suitable set screw 147 is provided for holding a drill 146ª in the drill holder 146.

Figures 9, 10:
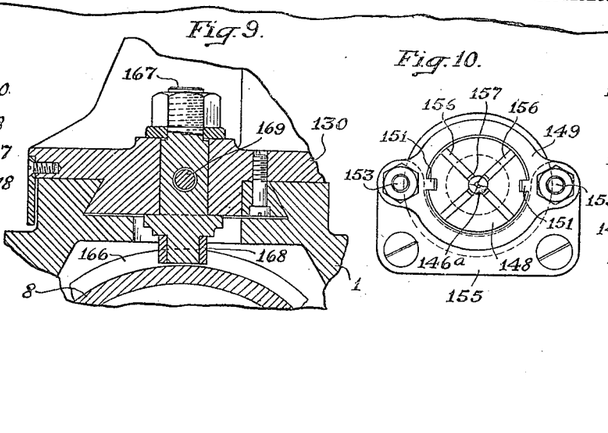
Fig. 9 is a sectional view taken along line 9—9 of Fig. 1.
Fig. 10 is an end view and Fig. 11 is a plan view of a drill collar in position.
Figure 11:
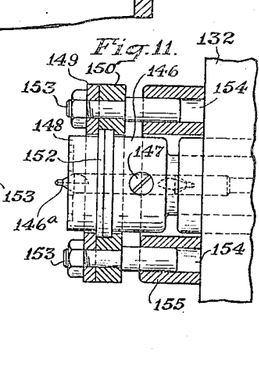
Figure 12:
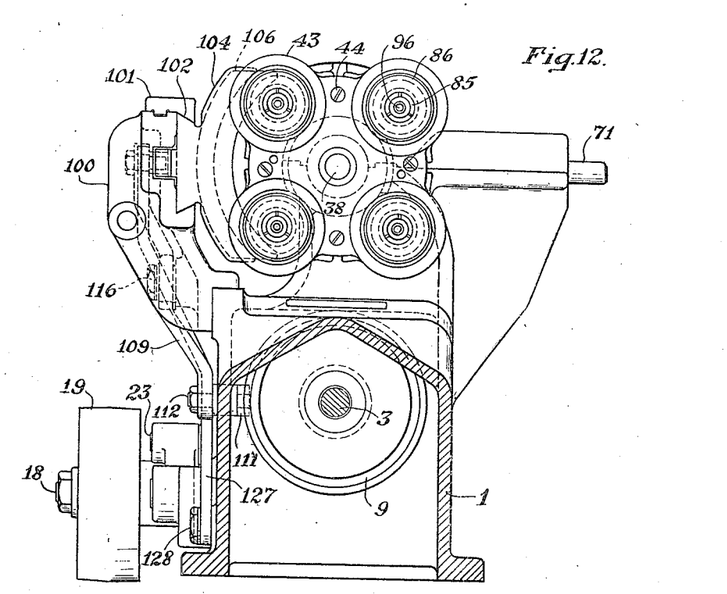
Fig. 12 is a sectional view along the line 12—12 of Fig. 1.

A sleeve 148, as shown in Figs. 7, 10 and 11 of the drawings, is held adjacent to the drill holder 146 and serves to engage the end of a blank when the center hole in the blank is drilled to depth. The sleeve 148 is held in position adjacent to the drill holder 146 by means of a plate 149 and a cap 150. The cap 150 has a shoulder formed thereon which engages a flange on the drill holder 146. The plate 149 has tongues 151 extending therefrom which project into notches formed in the sleeve 148. The plate 149 also engages the flange 152 on the sleeve. Thus, the plate 149 not only serves to hold the sleeve 148 against any rotative movement but also holds the sleeve in position adjacent to the drill holder 146. The sleeve 148 is so positioned with respect to the drill holder 146 that the holder may rotate freely without interference from the sleeve. The plate 149 is held in engagement with the cap 150 by means of two bolts 153. The bolts 153 project into holes 154 formed in a block 155. The block 155 is suitably secured to the drill slide 130. The bolts 153 are loosely connected to the block 155 in order that the cap and plate connected thereto may follow the longitudinal movement of the drill spindle in the drill slide.

The sleeve 148 is provided with grooves 156 in the end thereof which serve to carry away the chips which are cut from the blank. Moreover, grooves 157 are formed in the central portion of the sleeve, as shown in Fig. 10 of the drawings, for forming sharp edges which break up the chips which are cut from the blanks.

The drill slide 130 is moved towards and away from the blanks by means of a cam groove 166 which is formed on the cam drum 8. A bolt 167, which is carried by the slide 130, has a roller 168 on the lower end thereof which operates in the cam groove 166. A screw threaded rod 169 is provided for adjusting the slide 130 with respect to the bolt 167. The rod 169 is threadably connected to the bolt 167 and is provided with a shoulder 170 which is disposed between the end of the slide 130 and the end plate 171. The shoulder 170 serves to prevent longitudinal movement of the rod 169 with respect to the slide.

Figure 4:
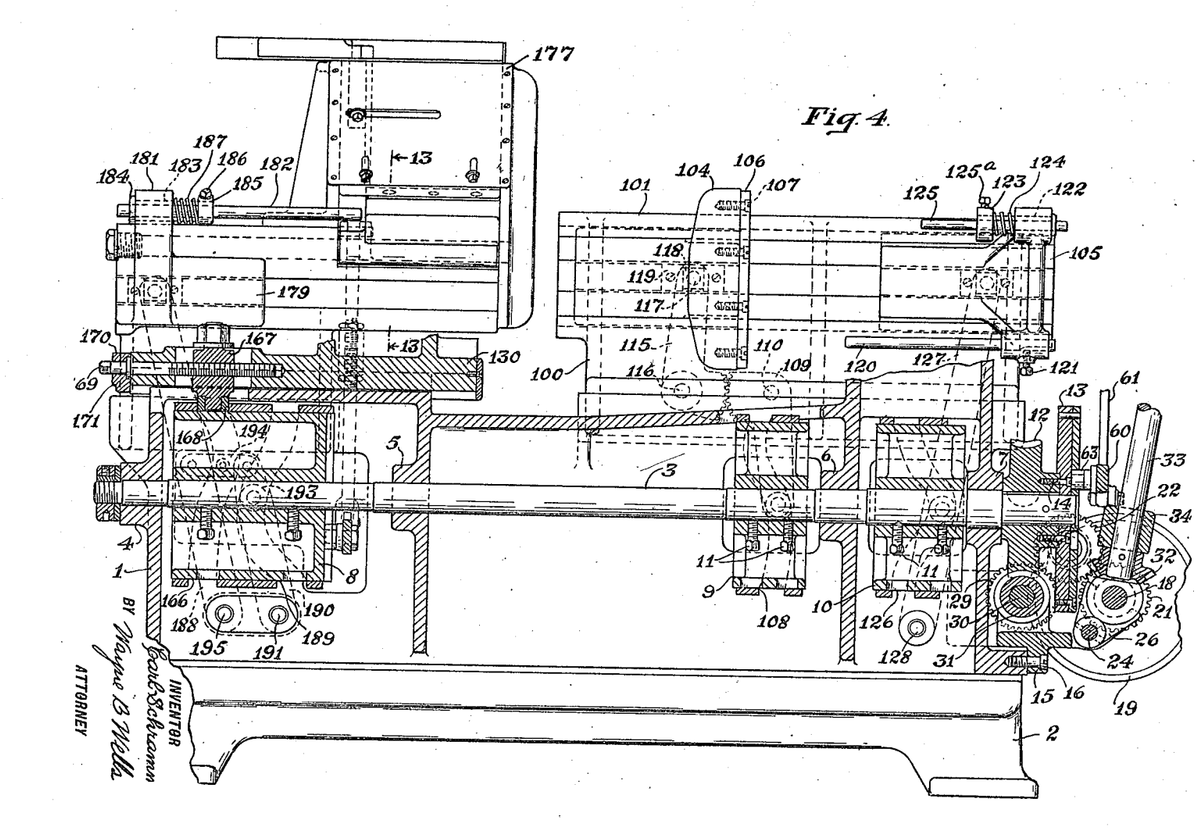
Fig. 4 is a sectional view along the line 4—4 of Fig. 2.

A hopper supporting bracket 175 is secured to the main frame 1 by means of screws 176. The bracket 175 carries a hopper 177, a transfer mechanism 178 and a loading slide 179. The loading slide 179 operates in a guideway 180 formed in the bracket 175 and is provided with an upwardly projecting arm 181. The arm 181 carries a loading rod 182. A bushing 183, which has a shoulder 184 formed on one end tnereof, projects through the arm 181 and carries the rod 182. A nut 185, which is threadably connected to one end of the bushing 183, is connected to the rod 182 by means of a set screw 186. A spring member 187 is disposed between the nut 185 and the arm 181, as shown in Fig. 4 of the drawings, to exert a force tending to move the rod 182 and the sleeve 184 to an extreme position towards the hopper 177. The slide 179 is operated by a lever 188 in accordance with the shape of the cam groove 189 which is formed on the surface of the drum 8. A short lever 190, which is pivotally supported on the main frame 1 by means of the stud bolt 191, is provided with a bolt 192 having a roller 193 thereon which operates in the cam groove 189. The upper end of the lever 190 is connected to the lever 188 by means of suitable connecting links 194. The lever 188 is pivotally supported by a bolt 195 on the main frame 1. The upper end of the lever 188 is connected to the slide 179 by a connection similar to the connection described for the bell crank lever 115 to the chuck closing slide 104.

The rod 182 on the slide 179 is aligned with the rod 125 on the slide 105. Upon movement of the slide 179 towards the right, as shown in Fig. 4 of the drawings, a blank, which has been taken from the hopper 177 in the manner to be hereinafter set forth, is pushed by the rod 182 into a blank carrying chuck which is aligned with the rod 125. The rod 125 limits the movement of the blank by the rod 182. It should be noted that the spring member 187 permits a limited longitudinal movement of the rod 182 and the sleeve 183 when the blank is forced into position.

The blanks, which are carried by the hopper 177, are moved by means of a transfer member 196 into position to be operated on by the rod 182. The transfer member 196 has a groove 197 formed therein for receiving a blank and is secured to a transfer rocker member 198 by means of screws 199. In Fig. 13 of the drawings, the transfer member 196 is shown in such position that the blank carried thereby is aligned with the rod 182 on the slide 179. The transfer rocker member 198 has an arm 200 extending therefrom which is connected by a rod 201 to a lever 202. The lever 202 is pivotally supported on one side of the main frame 1 of the machine, as shown in Fig. 3 of the drawings. A roller member 203, which is supported on the lever 202, operates in a cam groove 204. The groove 204 is formed on the end of the cam drum 8. Thus, it is apparent the transfer member 196 is operated in accordance with the shape of the cam groove 204 for carrying blanks from the hopper 177 to a position in line with the rod 182.

In the machine above described, four stations are provided. At the first station, blanks are loaded in the blank carrying spindles on the turret. At the second station, the blanks are roughly centered. At the third station, the center holes in the blanks are finished and at the fourth station, the blanks are forced out of the chucks on the turret. By providing a roughing and finishing station, it is not necessary to take the time that is ordinarily necessary if the drilling of the center holes is effected at one station. The blanks carried by the blank spindles and the drills are rotated in opposite directions in order to accurately center the holes and to increase the speed. Moreover, the drill spindles are resiliently supported in order to permit a limited longitudinal movement thereof when the drill spindles engage the blanks.

Modifications in the machine and in the arrangement and location of parts may be made within the spirit and scope of my invention and such modifications are intended to be covered by the appended claims.

What I claim is:

1. In a machine tool for centering blanks, the combination with a spindle carrying a roughing drill, a spindle carrying a finishing drill, feeding means for said spindles having a resilient element therein to permit a limited longitudinal movement when in engagement with the blanks, and means for rotating said drill spindles, of a turret for carrying a plurality of blanks, means for indexing the turret to move the blanks into operative relation to the drills, and means for rotating the blanks in a direction opposite to the direction of rotation of said drill spindles.

2. In a machine tool for centering blanks, the combination with a rotating roughing drill, a rotating finishing drill, and a turret carrying a plurality of blanks, of automatic means for loading and unloading the blanks, automatic means for indexing the turret, automatic means for moving the drills into engagement with the blanks, and means for so advancing the drills as to effect a yielding engagement with the blanks.

3. In a machine tool for centering blanks, the combination with a rotating roughing drill, a rotating finishing drill, and a turret carrying a plurality of blanks, of automatic means for loading and unloading the blanks, automatic means for moving the drills into engagement with the blanks, means for so advancing the drills as to effect a yielding engagement with the blanks, and means for rotating the blanks in a direction opposite to the direction of rotation of the drills.

4. In a machine tool for centering blanks, the combination with a rotating spindle carrying a roughing drill, a rotating spindle carrying a finishing drill, a turret, blank carrying spindles mounted in said turret, of means for automatically indexing the turret to move the blanks into operative relation to the drills, automatic means for loading and unloading the blanks, automatic means for moving the drills towards the turret, and means comprising spring members for so advancing the drill spindles as to effect a yielding engagement between the blanks and the drills.

5. In a machine tool for centering blanks, the combination with a drill slide, a rotating spindle carrying a roughing drill, a rotating spindle carrying a finishing drill, means for so mounting said spindles on the drill slide as to permit a limited longitudinal movement, and spring members for exerting a force on said spindles tending to move the drill to a limiting position towards the blanks, a turret, and blank carrying spindles mounted in said turret, of means for automatically indexing the turret to move the blanks into operative relation to the drills, automatic means for loading and unloading the blanks, and automatic means for operating the drill slide.

6. In a machine tool for centering blanks, the combination with a drill slide, a rotating spindle carrying a roughing drill, a rotating spindle carrying a finishing drill, means for so mounting said spindles on the drill slide as to permit a limited longitudinal movement, and spring members for exerting a force on said spindles tending to move the drill to a limiting position towards the blanks, a turret, and blank carrying spindles mounted in said turret, of means for automatically indexing the turret to move the blanks into operative relation to the drills, automatic means for loading and unloading the blanks, automatic means for operating the drill slide, and means for rotating the drill spindle and the blank spindles in opposite directions.

7. In a machine tool for centering blanks, the combination with a turret having four blank carrying spindles, a tool slide, spindles mounted on said slide carrying a roughing drill and a finishing drill, means for rotating the drill spindles and the blank spindles in opposite directions, and a cam shaft, of means automatically controlled in accordance with the movement of the cam shaft for indexing the blank turret, means automatically controlled by said cam shaft for moving the drills into engagement with the blanks and for loading a blank in the turret, resilient means for so advancing the drill spindles on said slide as to effect yielding engagement between the blanks and the drills, and means automatically controlled by said cam shaft for limiting the position of one blank in the turret and for unloading another blank, and means automatically controlled by the cam shaft for clamping and unclamping the blanks in the turret spindles.

8. In a machine tool for centering blanks, the combination with a spindle carrying a blank, and a spindle carrying a drill, of means for rotating the spindles in opposite directions, and means for effecting relative longitudinal movement between the blank spindle and the drill spindle, and resilient means for so advancing the drill spindle as to effect yielding engagement between the drill and the blank.

9. In a machine tool for centering blanks, the combination with two spindles carrying blanks, two spindles carrying a roughing and a finishing drill, of means for rotating the drill spindles and the blank spindles in opposite directions, means for effecting relative longitudinal movement between the drill spindles and the blank spindles to simultaneously effect a roughing and a finishing operation, and resilient means for so advancing the drill spindles as to effect yielding engagement between the blanks and the drills.

10. In a machine tool for centering blanks, the combination with a rotating spindle having a drill mounted therein, spring means for so advancing the drill spindle as to permit a limited movement when in engagement with a blank, a turret for carrying blanks, means for rotating the blanks in the turret, and means for rotating the drill spindle, of means for indexing the turret to bring the blanks into operative relation to the drill, and means for moving the drill longitudinally into engagement with the blanks.

11. In a machine tool for centering blanks, the combination with a spindle having a drill mounted therein, spring means for so advancing the drill spindle as to permit a limited longitudinal movement when in engagement with a blank, a turret spindle for supporting blanks in the turret, and means for rotating the blanks in the turret and the drill spindle in opposite directions, of automatic means for indexing the turret to bring the blanks into operative relation to the drill, automatic means for moving the drill longitudinally into engagement with the blanks, and a non-rotating sleeve loosely mounted on the drill spindle for engaging the blank when drilled to depth.

12. In a machine tool for centering blanks, the combination with a spindle having a drill mounted therein, spring means for so advancing the drill spindle as to permit a limited longitudinal movement when in engagement with a blank, a turret, spindles for supporting blanks in the turret, and means for rotating the blank spindles in the turret and the drill spindle in opposite directions, of automatic means for indexing the turret to bring the blanks into operative relation to the drill, automatic means for moving the drill longitudinally into engagement with the blanks, and a sleeve held against rotation and loosely mounted on the drill spindle for engaging the blanks when drilled to depth, said sleeve having grooves formed inside thereof adjacent the drill for breaking up the chips and grooves formed on the end of the sleeve to permit the passage of the chips therethrough when in engagement with a blank.

13. In a machine tool for centering blanks, the combination with two rotating spindles having a roughing and a finishing drill mounted therein, resilient means for so advancing the drill spindles as to permit a limited longitudinal movement when in engagement with the blanks, a blank carrying turret, and spindles for supporting blanks in the turret, of means for indexing the turret to move the blanks into operative relation to the drills, means for moving the drill spindles towards the turret for drilling the blanks to the proper depth, means for rotating the blank spindles and the drill spindles, and a sleeve held against rotation and loosely mounted on each drill spindle for engaging the blank when drilled to depth.

14. In a machine tool for centering blanks, the combination with two rotating spindles having a roughing and a finishing drill mounted therein, spring members for so advancing the drill spindles as to permit a limited longitudinal movement when in engagement with the blanks, a turret, and blank carrying spindles mounted in said turret, of means for indexing the turret to move the blanks into operative relation to the drills, means for moving the drill spindles towards the turret for drilling the blanks to the proper depth, means for rotating the blank spindles in a direction opposite to the rotation of the drill spindles, and non-rotating sleeves loosely mounted on the drill spindles for engaging the blanks when drilled to depth.

15. In a machine tool, the combination with a spindle for supporting a blank, a spindle for supporting a drill, and means for rotating the drill spindle and the blank spindle in opposite directions and for moving the spindles towards each other, of a sleeve loosely mounted on the drill spindle for engaging the blank when drilled to depth, said sleeve having grooves formed inside thereof adjacent the drill for breaking up the chips and grooves formed on the end of the sleeve.

In testimony whereof, I hereto affix my signature.

CARL SCHRAMM.